(12) United States Patent
Shin et al.

(10) Patent No.: US 9,124,863 B2
(45) Date of Patent: Sep. 1, 2015

(54) DEVICE AND METHOD FOR CREATING MULTI-VIEW VIDEO CONTENTS USING PARALLEL PROCESSING

(75) Inventors: Hong-Chang Shin, Daejeon-si (KR); Gun Bang, Daejeon-si (KR); Gi-Mun Um, Daejeon-si (KR); Tae One Kim, Daejeon-si (KR); Eun Young Chang, Daejeon-si (KR); Nam Ho Hur, Daejeon-si (KR); Soo In Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 865 days.

(21) Appl. No.: 13/328,713

(22) Filed: Dec. 16, 2011

(65) Prior Publication Data

US 2012/0154533 A1    Jun. 21, 2012

(30) Foreign Application Priority Data

Dec. 17, 2010    (KR) .......................... 10-2010-0130204

(51) Int. Cl.
*H04N 13/00*    (2006.01)
*H04N 13/02*    (2006.01)

(52) U.S. Cl.
CPC ......... *H04N 13/0011* (2013.01); *H04N 13/004* (2013.01); *H04N 13/0242* (2013.01); *H04N 13/0014* (2013.01); *H04N 13/0239* (2013.01)

(58) Field of Classification Search
CPC ............ H04N 13/011; H04N 13/0014; H04N 13/004; H04N 13/0239; H04N 13/0242
USPC .............................................. 348/E13.001, 43
See application file for complete search history.

(56) References Cited

U.S. PATENT DOCUMENTS

| | | | | |
|---|---|---|---|---|
| 2009/0066706 | A1* | 3/2009 | Yasue et al. ................... | 345/505 |
| 2009/0207179 | A1* | 8/2009 | Huang et al. .................. | 345/505 |
| 2010/0026712 | A1* | 2/2010 | Aliprandi et al. ............. | 345/629 |

* cited by examiner

*Primary Examiner* — Sath V Perungavoor
*Assistant Examiner* — Dakshesh Parikh
(74) *Attorney, Agent, or Firm* — H.C. Park & Associates, PLC

(57) ABSTRACT

A device for creating multi-view video contents includes a virtual view position and distribution unit that calculates a plurality of virtual views corresponding to the number of predetermined virtual views based on input information and distributes the calculated positions of the plurality of virtual views to a plurality of view synthesis processing units; a view synthesis processor that operates the plurality of view synthesis processing units in parallel, allows each of the view synthesis processing units to create at least one virtual view video corresponding to a position of at least one virtual view distributed from the virtual view position calculation and distribution unit, and performs partial multiplexing based on at least one created virtual view video; and a video integration unit that integrates a plurality of partially multiplexed videos output from the plurality of view synthesis processing units.

14 Claims, 4 Drawing Sheets

DEVICE AND METHOD FOR CREATING MULTI-VIEW VIDEO CONTENTS USING PARALLEL PROCESSING

CROSS-REFERENCE TO RELATED APPLICATIONS

This application claims the benefit of priority of Korean Patent Application No. 10-2010-0130204 filed on Dec. 17, 2010, which is incorporated by reference in their entirety herein.

BACKGROUND OF THE INVENTION

1. Field of the Invention

The present invention relates to a device and method for creating multi-view video contents using parallel processing, and more particularly, to a technology of creating multi-view video contents capable of remarkably reducing time consumed to create multi-view video contents by performing view synthesis and multiplexing for creating virtual view videos in parallel using a plurality of view synthesis processing units.

2. Related Art

Generally, a three-dimensional display may allow a user to feel a three-dimensional effect by simultaneously providing a two-dimensional video signal of two views or more basically using disparity to both eyes of a person. A multi-view display may imply a display that plays video of two views or more to provide a three-dimensional effect.

An example of a representative method for creating multi-view video contents on a multi-view display may include a multi-view video synthesis method. The multi-view video synthesis method is a method for performing view synthesis using reference video captured by a multi-view camera having disparity and geometry information corresponding to the reference video, for example, depth information including depth video, etc.

The view synthesis maps the reference video captured by a camera to a position of a target virtual view using the geometry information (for example, camera calibration information, depth information on individual pixels, etc.). In this case, an non-mapped occluded area may be filled by a process of mapping using the reference video having different disparities and finally creating videos at a position of a virtual view by finding and interpolating the surrounding similar information. The finally created multi-view videos are played by being subjected to a multiplexing process in order to be matched with the input conditions of the multi-view display.

Generally, the multi-view video synthesis creating a plurality of views required by the multi-view display may be said to be a time consuming method that consumes a lot of time. Therefore, considering a real-time creating and playing system of the multi-view video, there is a need to efficiently improve a device structure and a processing method in order to improve a processing speed during the multi-view video synthesis.

SUMMARY OF THE INVENTION

The present invention provides a device and method for creating multi-view video contents using parallel processing capable of reducing time consumed to create multi-view video contents and increase efficiency of resource used by performing synthesis and partial multiplexing, etc., on virtual view videos in parallel for creating multi-view video contents using a plurality of view synthesis processing units.

In an aspect, a device for creating multi-view video contents using parallel processing is provided. The device for creating multi-view video contents using parallel processing includes: a virtual view position calculation and distribution unit that calculates positions of a plurality of virtual views corresponding to the number of predetermined virtual views based on input information and distributes the calculated positions of the plurality of virtual views to a plurality of view synthesis processing units; a view synthesis processor that operates the plurality of view synthesis processing units in parallel, allows each of the view synthesis processing units to create at least one virtual view video corresponding to a position of at least one virtual view distributed from the virtual view position calculation and distribution unit, and performs partial multiplexing based on at least one created virtual view video; and a video integration unit that integrates a plurality of partially multiplexed videos output from the plurality of view synthesis processing units.

The virtual view position calculation and distribution unit may distribute the position of at least one virtual view to each of the view synthesis processing units and transmit input information required to create at least one virtual view video corresponding to the position of at least one virtual view to each of the view synthesis processing units.

Each of the view synthesis processing units may use videos from at least one adjacent reference camera at the positions of the virtual views to perform three-dimensional warping to the virtual view videos at the positions of the virtual views and interpolate an area non-mapped even with the three-dimensional warping among the virtual view areas using surrounding information. The video integration unit may multiplex the plurality of partially multiplexed videos output from the plurality of view synthesis processing units.

The device for creating multi-view video contents using parallel processing may further include a video input unit inputting a plurality of reference videos captured by a plurality of reference cameras and input information including at least one of depth information, camera calibration information, and user input information.

In another aspect, a method for creating multi-view video contents using parallel processing is provided. The method for creating multi-view video contents using parallel processing includes: calculating positions of a plurality of virtual views corresponding to the number of predetermined virtual views based on input information; distributing the calculated positions of the plurality of virtual views to a plurality of view synthesis processing units; operating the plurality of view synthesis processing units in parallel to allow each of the view synthesis processing units to create at least one virtual view video corresponding to the position of at least one virtual view distributed from the virtual view position calculation and distribution unit; allowing each of the view synthesis processing units to perform partial multiplexing based on at least one created virtual view video; and integrating a plurality of partially multiplexed videos output from the plurality of view synthesis processing units.

The distributing of the calculated positions of the plurality of virtual views to the plurality of view synthesis processing units may include distributing the position of at least one virtual view to each of the view synthesis processing units.

The method for creating multi-view video contents using parallel processing may further include transmitting input information required to create at least one virtual view video corresponding to the position of at least one virtual view to each of the view synthesis processing units.

The creating of at least one virtual view video may include: using videos from at least one adjacent reference camera at the positions of the virtual views to perform three-dimensional warping to the virtual view videos at the positions of the virtual views, and interpolating an area non-mapped even with the three-dimensional warping among the virtual view areas using surrounding information.

The integrating of the plurality of partially multiplexed videos may include multiplexing the plurality of partially multiplexed videos output from the plurality of view synthesis processing units.

The method for creating multi-view video contents using parallel processing may further include inputting a plurality of reference videos captured by a plurality of reference cameras and input information including at least one of depth information, camera calibration information, and user input information.

In another aspect, a view synthesis processing device is provided. The view synthesis processing device includes a plurality of view synthesis processing units operable in parallel.

Each of the view synthesis processing units receives a position of at least one virtual view and input information from the outside, generates at least one virtual view video corresponding to at least one position based on the input information, and performs partial multiplexing based on at least one created virtual view video.

Each of the video synthesis processing units may output the partially multiplexed videos to a video integration unit for integrating videos output from the plurality of view synthesis processing units.

DESCRIPTION OF EXEMPLARY EMBODIMENTS

Hereinafter, exemplary embodiments of the present invention will be described in detail with reference to the accompanying drawings so that technical content of the present invention can be easily understood by those skilled in the art to which the present invention pertains. In the exemplary embodiments of the present invention described below, specific technical terminologies are used for clarity of content. However, the present invention is not limited to the selected specific terminologies. It should be understood that each of the specific terminologies includes all technical synonyms having similar meaning for accomplishing a similar object.

Figure 1:
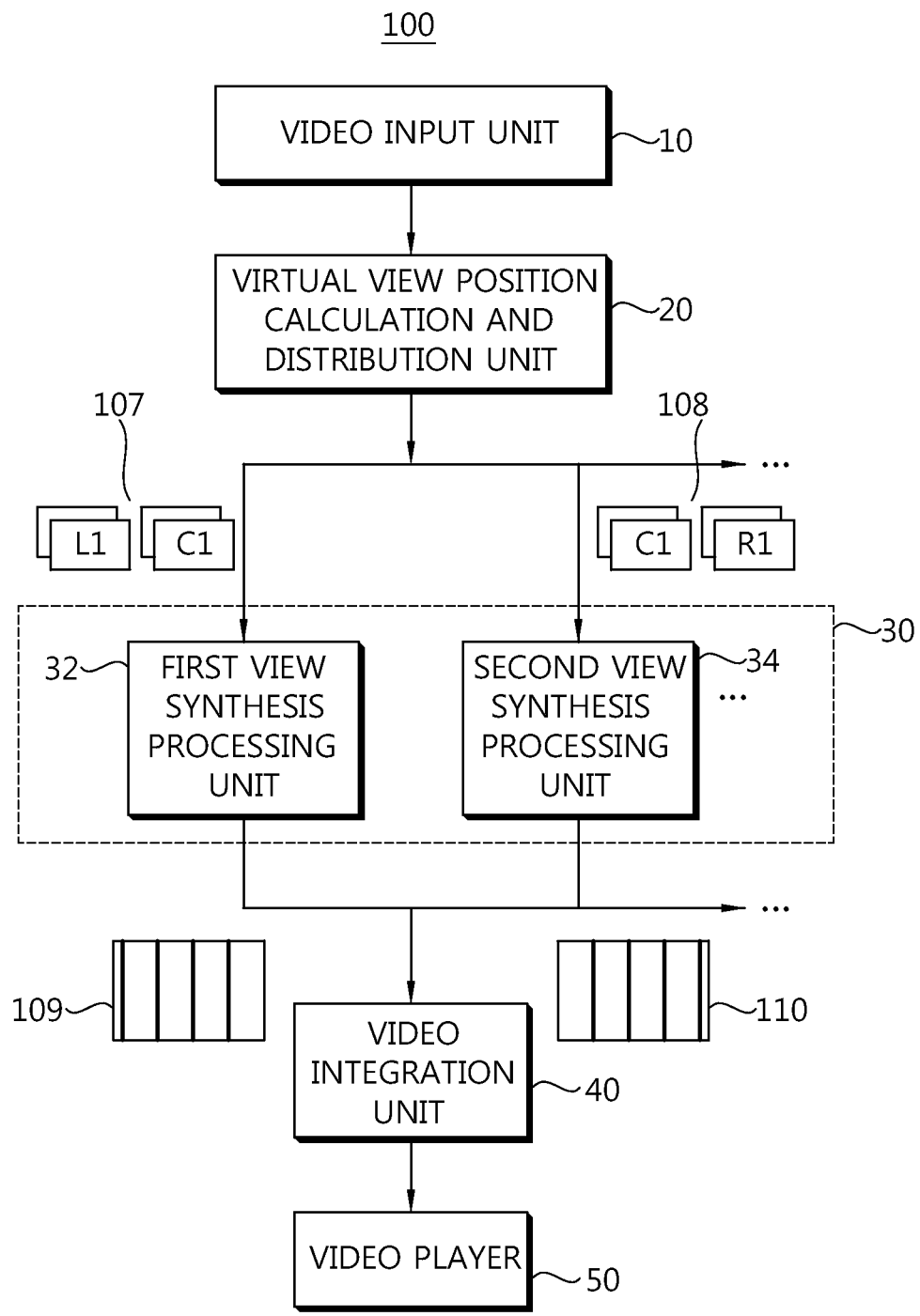
FIG. 1 is a block diagram showing a configuration of a device for creating multi-view video contents using parallel processing according to an exemplary embodiment of the present invention.

FIG. 1 is a block diagram showing a configuration of a device for creating multi-view video contents using parallel processing according to an exemplary embodiment of the present invention.

As shown in FIG. 1, a device 100 for creating multi-view video contents using parallel processing may be configured to include a video input unit 10, a virtual view position calculation and distribution unit 20, a view synthesis processor 30, a video integration unit 40, a video player 50, or the like.

The video input unit 10 may serve to input reference video captured by a camera and input information including depth information, camera calibration information, user input information, etc.

For example, the video input unit 10 inputs the reference video and the depth information (for example, depth video, disparity video, etc.) including geometry information on the reference video from a plurality of cameras required for the multi-view videos, for example, a left camera, a reference camera, a right camera, etc., respectively. In addition, the video input unit 10 may input the camera calibration information such as, for example, a camera calibration parameter, etc., and user input information, or the like.

The virtual view position calculation and distribution unit 20 may serve to calculate positions of a plurality of virtual views corresponding to a predetermined number of views and distribute the calculated positions of the plurality of virtual views to a plurality of view synthesis processing units 32 and 34 included in the view synthesis processor 30.

In this case, the virtual view position calculation and distribution unit 20 may distribute the positions of the plurality of virtual views so that the position of at least one virtual view corresponds to each of the view synthesis processing units 32 and 34. Which one of view synthesis processing units 32 and 34 the positions of each of the virtual views are distributed may be set in the virtual view position calculation and distribution unit by considering the performance information of each of the view synthesis processing units 32 and 34 or according to the user input.

In addition, the virtual view position calculation and distribution unit 20 may transmit input information required to create the virtual view videos at the virtual view positions, corresponding to the distributed positions of the virtual views, for example, the reference video, the depth information, the camera calibration information, and the user input information.

That is, the virtual view position calculation and distribution unit 20 may calculate the positions of the plurality of virtual views corresponding to the number of views required for the multi-view display, distribute the calculated positions of the plurality of virtual views to the plurality of view synthesis processing units 32 and 34, and transmit the input information required for the view synthesis at the positions of each of the virtual views to the view synthesis processing units 32 and 34 requiring the input information.

The view synthesis processor 30 includes the plurality of view synthesis processing units 32 and 34. The plurality of view synthesis processing units 32 and 34 may be operated in parallel. For example, as shown in FIG. 1, the view synthesis processor 30 includes two view synthesis processing units 32 and 34, for example, the first view synthesis processing unit 32 and the second view synthesis processing unit 34. The first view synthesis processing unit 32 and the second view synthesis processing unit 34 may be operated in parallel. Meanwhile, as shown in FIG. 1, the view synthesis processor 30 is only the example. Therefore, the view synthesis processor may include view synthesis processing units more than the above mentioned number according to the implementation environment, for example, N (N is an integer exceeding 2) view synthesis processing units.

Each of the view synthesis processing units 32 and 34 may serve to receive the position of at least one virtual view and the input information required for the virtual view video synthesis at the position of the virtual view transmitted from the virtual view position calculation and distribution unit 20, create at least one virtual view video corresponding to the position of at least one virtual view based on the input information, and perform the partial multiplexing based on at least one created virtual view video.

The view synthesis processor 30 is a device that has a multi core provided therein, which may be implemented to operate a plurality of cores in parallel. For example, each of the view synthesis processing units 32 and 34 is independently presented from a main processor and thus, may be said to correspond to the cores that are not affected sequentially.

The video integration unit 40 may serve to integrate a plurality of partially multiplexed videos 109 and 110 output from the plurality of view synthesis processing units 32 and 34. The videos output from each of the view synthesis processing units 32 and 34 are the partially multiplexed videos 109 and 110 based on at least one virtual view video processed in the corresponding view synthesis processing unit. Therefore, the video integration unit 40 integrates the partially multiplexed videos 109 and 110 output from each of the view synthesis processing units 32 and 34 to create the finally multiplexed video, that is, the multi-view video contents.

The video player 50 may serve to play the video output from the video integration unit 40. For example, the video player 50 plays the multi-view video contents output from the video integration unit 40 on the multi-view display screen. The video player 50 may include a display device providing the multi-view display function. When the multi-view video contents are played by the video player 50, the user may watch a three-dimensional video.

The configuration of the device 100 for creating multi-view video contents using parallel processing was described above. Hereinafter, the operation of the device 100 for creating multi-view video contents using parallel processing will be described in detail. Further, the functions of each component of the device 100 for creating multi-view video contents using parallel processing will be more apparent by the above description.

Hereinafter, it is assumed that 3 reference cameras required to capture the reference video, that is, a left camera, a reference camera (for example, a center camera), and a right camera are provided and the number of virtual views required in the multi-view display is 9. In this case, the number of virtual views required in the multi-view display may be set beforehand by being previously set in the virtual view position calculation unit.

In addition, it is assumed that the view synthesis processing units 32 and 34 included in the view synthesis processor 30 includes two, that is, the first view synthesis processing unit 32 and the second view synthesis processing unit 34. In this configuration, it is assumed that the first view synthesis processing unit 32 performs the view synthesis processing from a first virtual view to a fourth virtual view and the second view synthesis processing unit 34 performs the view synthesis processing from a fifth virtual view to a ninth virtual view.

However, the assumption is only an example and therefore, is not limited thereto. The number of reference cameras, the number of virtual views, the number of view synthesis processing units included in the view synthesis processor, the correspondence between the virtual views and the view synthesis processing units, etc., may be variously modified according to the implementation environment.

For example, when the virtual view is 9, the view synthesis processor is configured to include 9 view synthesis processing units and each of the view synthesis processing units may perform the view synthesis processing and multiplexing corresponding to a single virtual view. That is, 9 view syntheses processing and multiplexing corresponding to 9 virtual views may be simultaneously processed in parallel using 9 view synthesis processing units.

Figure 2:
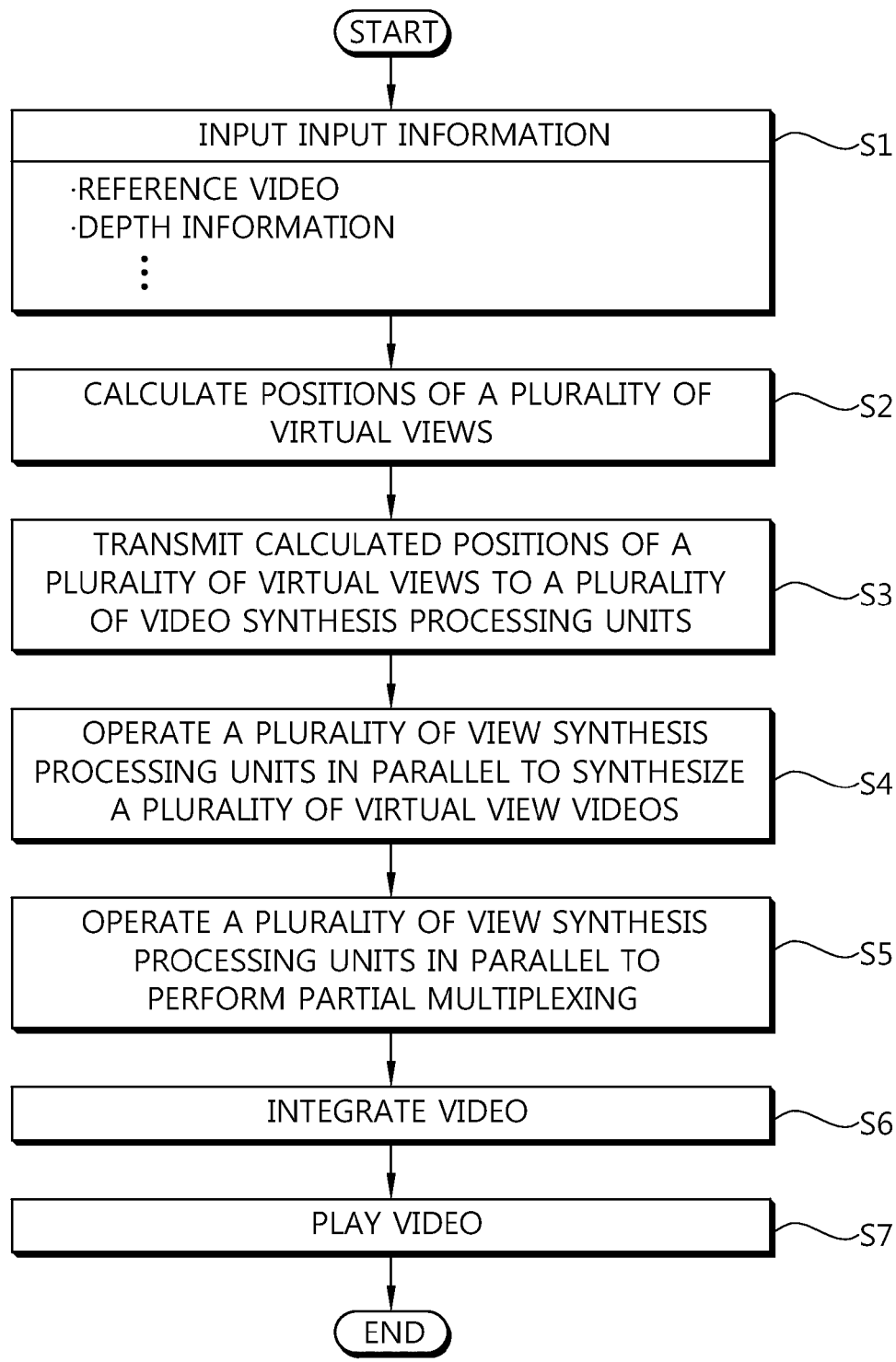
FIG. 2 is a flow chart for describing an operation of the device for creating multi-view video contents using parallel processing shown in FIG. 1.

FIG. 2 is a flow chart for describing an operation of the device 100 for creating multi-view video contents using parallel processing shown in FIG. 1. In addition, FIG. 3 is an exemplified diagram for describing a process of allowing the device 100 for creating multi-view video contents using parallel processing to create virtual view videos from video input.

Figure 3:
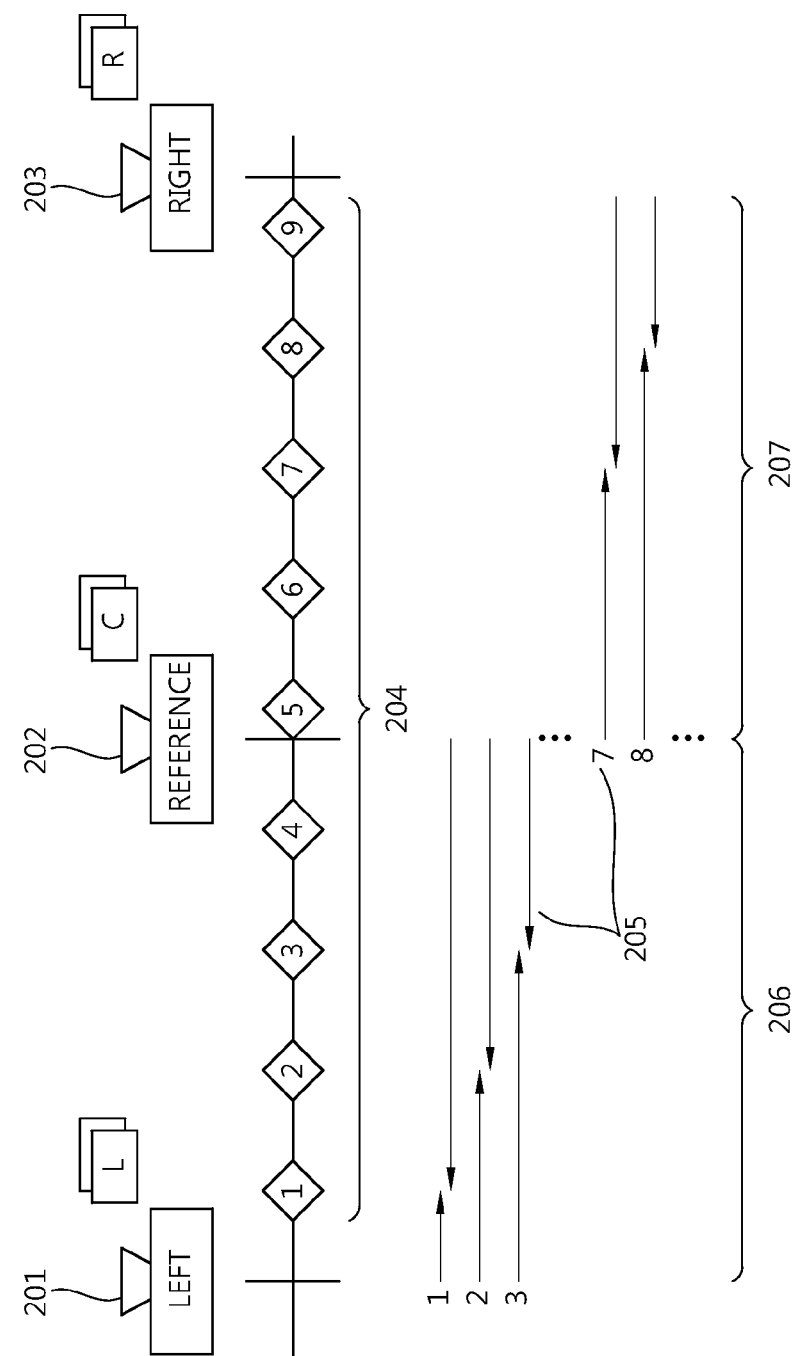
FIG. 3 is an exemplified diagram for describing a process of allowing the device for creating multi-view video contents using parallel processing to create virtual view videos from video input.

Referring to FIGS. 1 to 3, the video input unit 10 inputs the reference video and the input information including the depth information, the camera calibration information, the user input information, or the like (S1). For example, the video input unit 10 inputs the reference video captured by 3 reference cameras, for example, a left camera 201, a reference camera 202, and a right camera 203 and the input information including the depth information, the camera calibration information, the user input information, etc.

Thereafter, the virtual view position calculation and distribution unit 20 may calculate the positions of the plurality of virtual views corresponding to the number of views required in the multi-view display based on the input information (S2). The number of views required in the multi-view display may be previously set in the virtual view position calculation and distribution unit 20 by the user input, etc.

For example, the virtual view position calculation and distribution unit 20 may calculate 9 virtual views 204 corresponding to 9 views required in the multi-view display, for example, the positions of a first virtual view to a ninth virtual view, respectively.

The reason for calculating the positions of the virtual views is that all the intervals between the camera videos uses as the reference video may not be set equally and the view interval associated with the three-dimensional effect by the multi-view display, that is, the disparity between the view videos may be different according to the characteristics of the multi-view display. The position of the virtual view may be calculated considering coordinates of the reference camera that may be appreciated from the camera calibration information, the depth information acquired from the reference camera, the number of virtual views, characteristics of the multi-view display, etc. In addition, the position of the virtual view may be affected by the user input information.

When the position of the virtual view is calculated, the virtual view position calculation and distribution unit 20 may distribute the calculated positions of the plurality of virtual views to the plurality of view synthesis processing units 32 and 34 included in the view synthesis processor 30 (S3).

In this case, the virtual view position calculation and distribution unit 20 may distribute the positions of the plurality of virtual views so that the position of at least one virtual view corresponds to each of the view synthesis processing units 32 and 34. Further, the virtual view position calculation and distribution unit 20 may transmit the input information required to create the virtual view videos corresponding to the positions of each of the virtual views to the corresponding view synthesis processing units 32 and 34.

For example, the virtual view position calculation and distribution unit 20 may transmit positions of first, second, third, and fourth virtual views among the calculated positions of 9 virtual views 204 to the first view synthesis processing unit 32 and distribute positions of fifth, sixth, seventh, eighth, and ninth virtual view to the second view synthesis processing unit 34.

In addition, the virtual view position calculation and distribution unit 20 may transmit the information required to create the virtual view videos corresponding to the positions of the first, second, third, and fourth virtual views, for example, the reference video captured from the left camera and the reference camera and the information including the depth information 107, the camera calibration information of the corresponding referenced camera, etc., to the first view synthesis processing unit 32.

Similarly, the virtual view position calculation and distribution unit 20 may transmit the information required to create the virtual view videos corresponding to the positions of the fifth, sixth, seventh, eighth, and ninth virtual views, for example, the reference video captured from the right camera and the reference camera and the information including the depth information 108, the camera calibration information of the corresponding referenced camera, etc., to the second view synthesis processing unit 34.

Then, the view synthesis processor 30 may operate the plurality of view synthesis processing units 32 and 34 in parallel to synthesize the plurality of virtual view videos (S4). That is, the view synthesis processor 30 may operate the first view synthesis processing unit 32 and the second view synthesis processing unit 34 in parallel to synthesis 9 virtual view videos 205 corresponding to the positions of the 9 virtual views 204.

For example, the first view synthesis processing unit 32 may synthesize four virtual views, that is, four virtual view videos corresponding to the positions of the first, second, third, and fourth virtual views, that is, first, second, third, and fourth virtual view videos 206. The second view synthesis processing unit 34 operated in parallel with the first view synthesis processing unit may synthesize five virtual views, that is, five virtual view videos corresponding to the positions of the fifth, sixth, seventh, eighth, and ninth virtual views, that is, fifth, sixth, seventh, eighth, and ninth virtual view videos 207.

The view synthesis may be performed by a method that three-dimensionally warps the reference video to the targeted virtual view using the geometry information such as the depth information, etc. Reference numeral 205 shows a concept of creating the virtual view videos using the surrounding reference views. For example, when creating the virtual view videos at the third virtual view, the three-dimensional warping may be first performed using the position of the third virtual view and the reference video from the most adjacent reference camera 202. In this case, the information, which is also watched at the reference camera 202, among the virtual view videos at the position of the third virtual view may be mapped.

In this case, the area that has no information due to the non-mapping, that is, the area that is not watched at the view of the reference camera 202 is mostly filled with the reference video opposite to the area, that is, the reference video at the left camera 201 by the three-dimensional warping. Meanwhile, there may still be the non-mapped area even in the case of performing a two-time sequential mapping process. In this case, the non-filled remaining areas are filled by finding and interpolating the information having the highest similarity using the surrounding information of the corresponding area. In this case, the virtual view videos corresponding to the positions of the third virtual views are created.

Since the virtual view video synthesis process performs the mapping in a pixel unit and processes the videos having weak correlation between groups of individual pixels, it may be a process suitable for single instruction multiple data (SIMD), etc. Therefore, the parallel processing can be performed by a parallel processing device including a multi core, thereby making it possible to remarkably increasing the efficiency in terms of the processing speed.

When the synthesis of the virtual view videos is completed, the view synthesis processor 30 operates the plurality of view synthesis processing units 32 and 34 in parallel, thereby making it possible to perform the partial multiplexing for each view synthesis processing unit 32 and 34 (S5). That is, each of the view synthesis processing units 32 and 34 of the view synthesis processor 30 may perform the partial multiplexing based on at least virtual view video that is created by the view synthesis processing units 32 and 34.

Figure 4:
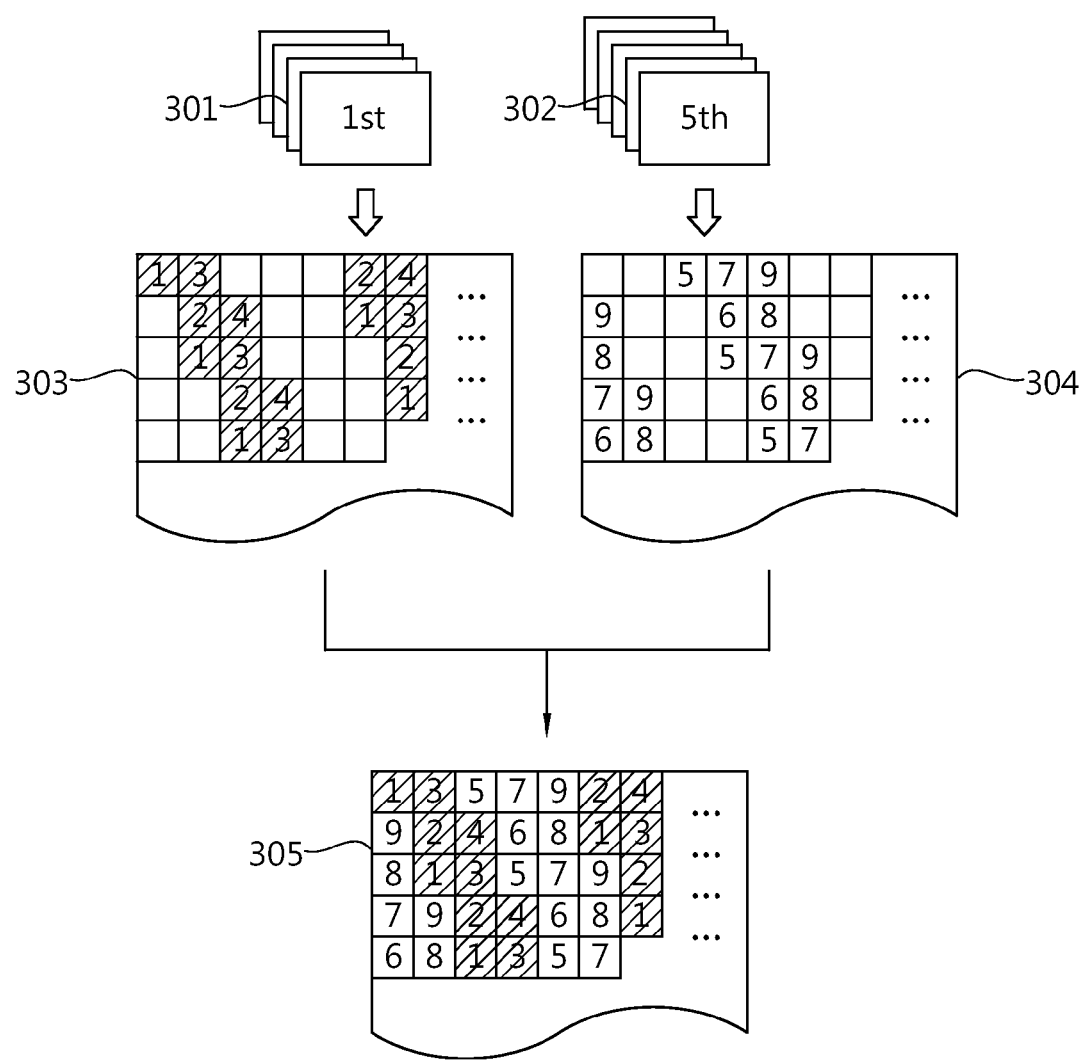
FIG. 4 is an exemplified diagram for describing a multiplexing process performed by the device for creating multi-view video contents.

FIG. 4 is an exemplified diagram for describing a multiplexing process performed by the device 100 for creating multi-view video contents.

The reason for performing the multiplexing in the multi-view display is to simultaneously provide the multi-view videos having disparity to the eyes of a person. That is, this is to simultaneously provide the multi-view videos to the eyes of a person by physically separating the display screen area.

As shown in FIG. 4, the first view synthesis processing unit 32 may create partial multiplexing video 303 reflecting four virtual view videos 301 based on the fourth synthesized virtual view videos 301. That is, the first view synthesis processing unit 32 performs the partial multiplexing based on the four virtual view videos 301 that are created by the first view synthesis processing unit 32.

In addition, the second view synthesis processing unit 34 may create the partially multiplexed video 304 reflecting the five virtual view videos 302 based on the five synthesized virtual view videos 302. That is, the second view synthesis processing unit 34 performs the partial multiplexing based on the five virtual view videos 302 that are created by the first view synthesis processing unit 32.

As shown in FIG. 4, the portion represented by a square in the partially multiplexed videos 303 and 304 or the multiplexed video 305 represents a pixel or a sub-pixel and numerals represented in a square imply numbers of virtual views. For example, when a numeral represented in a square is '1', it may imply pixels acquired from the first virtual view video.

As described above, the device 100 for creating multi-view video contents performs the view synthesis for the virtual view videos and the partial multiplexing in parallel using the plurality of view synthesis processing units, thereby making it possible to further maximize the processing speed.

Next, the video integration unit 40 may serve to multiplex and integrate the partially multiplexed videos 303 and 304 output from the plurality of view synthesis processing units 32 and 34 (S6). For example, the video integration unit integrates the partially multiplexed video 303 output from the first view synthesis processing unit and the partially multiplexed video 304 output from the second view synthesis processing unit, thereby making it possible to output the finally multiplexed video 305.

When completing the multiplexed structure such as the multiplexed video 305 using the 9 virtual view videos, the related art should sequentially process all of the 9 virtual view videos, thereby delaying the processing speed. On the other hand, the device 100 for creating multi-view video contents using parallel processing according to the exemplary embodiment of the present invention performs the view synthesis and the partial multiplexing in parallel without each of the view synthesis processing units 32 and 34 having an effect on each other, thereby making it possible to remarkably increase the processing speed and integrates each of the partially multiplexed videos 303 and 304 using the video integration unit 40, thereby making it possible to create the finally multiplexed videos.

When the video integration is completed, the video player 50 may play the videos output from the video integration unit 40 (57). For example, the video player 50 plays the multiplexed videos reflecting all of the 9 virtual view videos output from the video integration unit, that is, the multi-view video contents. Therefore, the user can watch the three-dimensional videos.

As set forth above, the device and method for creating multi-view video contents using parallel processing according to the exemplary embodiment of the present invention performs the synthesis, the partial multiplexing, etc., on the virtual view videos in parallel for creating the multi-view video contents using the plurality of view synthesis processing units. Therefore, the exemplary embodiment of the present invention can reduce time consumed to create the multi-view video contents and improve the efficiency of resource used.

Although the exemplary embodiments of the present invention have been described, it may be appreciated by those skilled in the art that various modifications and change can be made without departing from the spirit and scope of the appended claims of the present invention. Therefore, the future change in the embodiments of the present invention cannot depart from the technology of the present invention.

For example, the method of distributing the number of virtual views, the number of view synthesis processing units, the correspondence between the number of virtual views and the view synthesis processing units, the positions of the virtual views to the view synthesis processing unit, etc., may be variously modified according to the implementation environment. Therefore, the modification of the following exemplary embodiments of the present invention may not depart the technology of the present invention.

What is claimed is:

1. A device for creating multi-view video contents using parallel processing, the device comprising:
   a virtual view position calculation and distribution unit configured to calculate positions of a plurality of virtual views corresponding to the number of predetermined virtual views based on input information and distribute the calculated positions of the plurality of virtual views to a plurality of view synthesis processing units;
   a view synthesis processor configured to operate the plurality of view synthesis processing units in parallel, allow each of the view synthesis processing units to create a plurality of virtual view videos corresponding to positions of a plurality of virtual views distributed from the virtual view position calculation and distribution unit, and generate a partially multiplexed video via performance of partial multiplexing based on the plurality of created virtual view videos, wherein each of the view synthesis processing units is controlled by a hardware core processor; and
   a video integration unit configured to integrate a plurality of partially multiplexed videos output from the plurality of view synthesis processing units.

2. The device of claim 1, wherein the virtual view position calculation and distribution unit is configured to distribute the positions of the plurality of virtual views to each of the view synthesis processing units and transmit input information to create the plurality of virtual view videos corresponding to the positions of the plurality of virtual views to each of the view synthesis processing units.

3. The device of claim 1, wherein each of the view synthesis processing units is configured to perform three-dimensional warping to the plurality of virtual view videos at the positions of the plurality of virtual views using videos from at least one reference camera adjacent to the positions of the plurality of virtual views and interpolate an area non-mapped even with the three-dimensional warping among the plurality of virtual view areas using surrounding information.

4. The device of claim 1, wherein the video integration unit is configured to multiplex the plurality of partially multiplexed videos output from the plurality of view synthesis processing units.

5. The device of claim 1, further comprising:
   a video input unit configured to input a plurality of reference videos captured by a plurality of reference cameras and input information comprising at least one of depth information, camera calibration information, and user input information.

6. A method for creating multi-view video contents using parallel processing, the method comprising:
   calculating positions of a plurality of virtual views corresponding to the number of predetermined virtual views based on input information;
   distributing the calculated positions of the plurality of virtual views to a plurality of view synthesis processing units;
   operating the plurality of view synthesis processing units in parallel to allow each of the view synthesis processing units to create a plurality of virtual view videos corresponding to positions of a plurality of virtual views distributed from the virtual view position calculation and distribution unit;
   allowing each of the view synthesis processing units to generate a partially multiplexed video by performing partial multiplexing based on the plurality of created virtual view videos, wherein each of the view synthesis processing units is controlled by a hardware core processor; and
   integrating a plurality of partially multiplexed videos output from the plurality of view synthesis processing units.

7. The method of claim 6, wherein the distributing of the calculated positions of the plurality of virtual views to the plurality of view synthesis processing units comprises distributing the position of the plurality of virtual views to each of the view synthesis processing units.

8. The method of claim 6, further comprising:
   transmitting input information to create the plurality of virtual view videos corresponding to the positions of the plurality of virtual views to each of the view synthesis processing units.

9. The method of claim 6, wherein the creating of the plurality of virtual view videos comprises:
   performing three-dimensional warping to the plurality of virtual view videos at the positions of the plurality of virtual views using videos from at least one reference camera adjacent to the positions of the plurality of virtual views; and
   interpolating an area non-mapped even with the three-dimensional warping among the plurality of virtual view areas using surrounding information.

10. The method of claim 6, wherein the integrating of the plurality of partially multiplexed videos comprises multiplexing the plurality of partially multiplexed videos output from the plurality of view synthesis processing units.

11. The method of claim 6, further comprising:
    inputting a plurality of reference videos captured by a plurality of reference cameras and input information comprising at least one of depth information, camera calibration information, and user input information.

12. A view synthesis processing device, comprising:
a plurality of view synthesis processing units configured to operate in parallel,
wherein each of the view synthesis processing units is controlled by a hardware core processor, and
wherein each of the view synthesis processing units is configured to:
receive positions of a plurality of virtual views and input information from the outside;
generate a plurality of virtual view videos corresponding to the positions based on the input information; and
generate a partially multiplexed video via performance of partial multiplexing based on the plurality of created virtual view videos.

13. The view synthesis processing device of claim 12, wherein each of the view synthesis processing units is configured to perform three-dimensional warping to the plurality of virtual view videos at the positions of the plurality of virtual views using videos from at least one reference camera adjacent to the positions of the plurality of virtual views and interpolate an area non-mapped even with the three-dimensional warping among the plurality of virtual view areas using surrounding information.

14. The view synthesis processing device of claim 12, wherein each of the view synthesis processing units is configured to output the partially multiplexed videos to a video integration unit for integrating videos output from the plurality of view synthesis processing units.

* * * * *